Patented Mar. 4, 1947

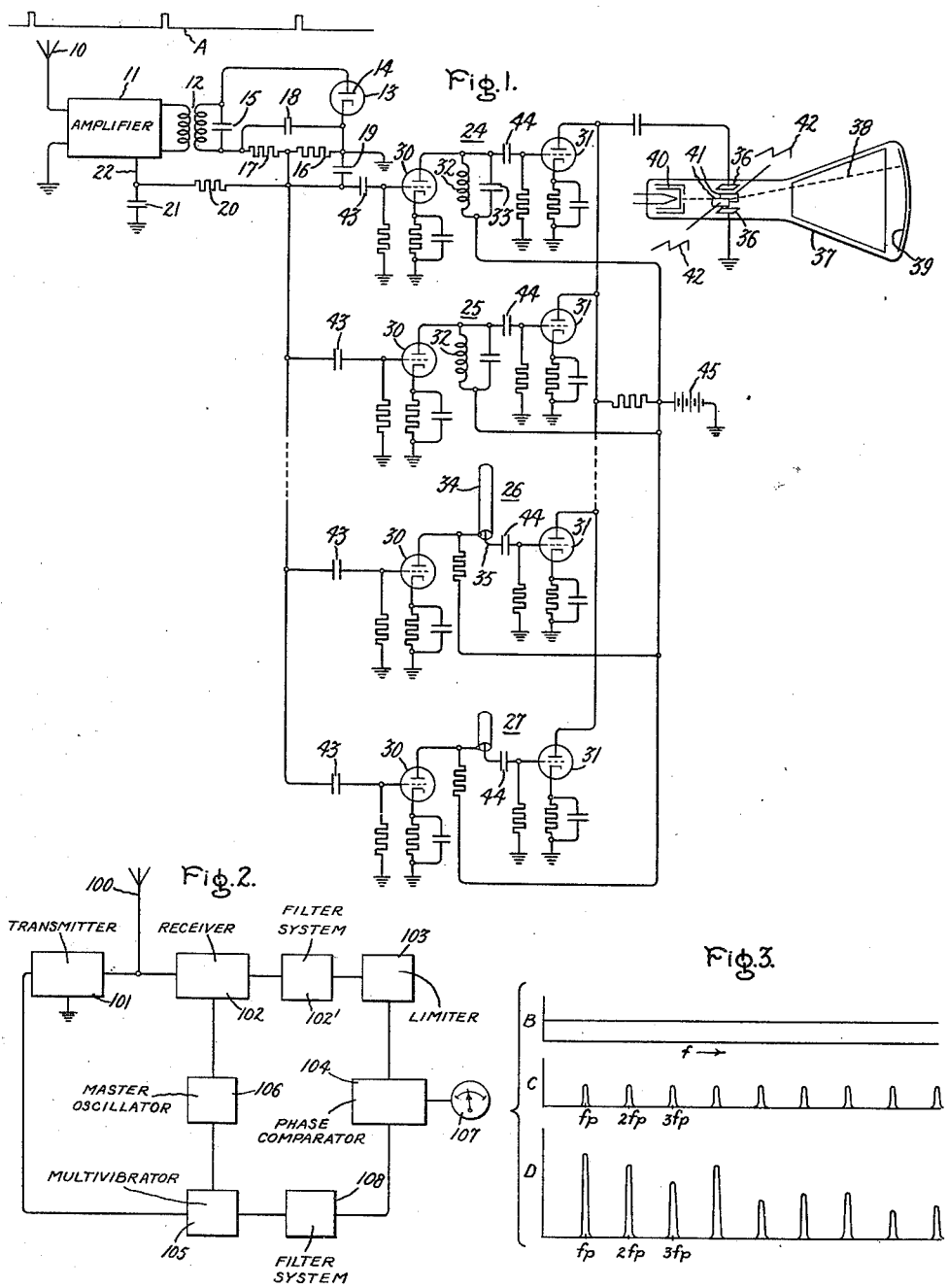

2,416,895

UNITED STATES PATENT OFFICE 2,416,895

PULSE SIGNALLING SYSTEM

Everhard H. B. Bartelink, West Milton, N. Y., assignor to General Electric Company, a corporation of New York Application October 2, 1942, Serial No. 460,487

8 Claims. (Cl. 250—1.66)

My invention relates to pulse signalling systems and particularly to such systems used either as radio echo apparatus or point-to-point communication systems. It is an object of my invention to provide means for reducing the noise in such a system.

It is well known that the non-sinusoidal periodic pulses used in a signalling system may be resolved, by Fourier series analysis, into a fundamental sine wave, having a frequency equal to the rate at which the pulses recur, plus an almost infinite number of sine waves whose frequencies are different harmonics of the fundamental. It is also known that the noise which occurs in radio receivers is irregular in character and covers the frequency band continuously, the noise energy received being proportional to the total band width of the receiver. It is an object of my invention, therefore, to reduce the noise in the output of the receiver of a pulsing system by providing narrow band response channels corresponding to the discrete harmonic frequencies of the pulse supplied by the transmitter.

In pulse signalling systems used for measuring the distance between a receiver and a reflecting object it is known that the phase relation between direct and reflected waves is an indication of the reflection time and may readily be converted into a measurement of the distance between the receiver and the reflecting body. It is another object of my invention to provide a noise reducing circuit for a pulse signalling system in which the number of band pass channels is reduced to one, and thus a single harmonic of the reflected wave is selected and its phase compared with the transmitted pulse.

In attempts to utilize the phase difference between two waves as a distance measuring means, since the direct signal, especially when the transmitting apparatus is relatively close to the receiver, is much more intense than the reflected signal, even after limiting of the former, the phase variation between the two signals is difficult to detect. This difficulty may be circumvented by supplying to the receiving apparatus a blanking pulse during the transmitting period. Accordingly, it is a further object of my invention to provide a translating circuit for a pulse signalling system in which a blanking pulse is supplied to the receiver during transmitting periods and the phase interval between the transmission of a signal and the reception of a reflected signal is measured.

Another object of my invention is to provide, in a phase measuring system of the above type, a blanking pulse having a frequency which is a multiple of the transmitter keying pulse frequency.

An additional object of my invention is to provide improved protection for the receiver of a pulse signalling system during a transmitting period by supplying a blanking pulse to desensitize the receiver during such periods.

The features of my invention which I believe to be novel are set forth with particularity in the appended claims. My invention itself, however, together with further objects and advantages thereof, may best be understood by reference to the following description taken in connection with the accompanying drawing, in which Fig. 1 shows schematically one form of my noise reduction system for the receiver of a pulse signalling system; Fig. 2 is a block diagram of a system embodying the receiver of Fig. 1; and Fig. 3 is a group of curves illustrating certain operating characteristics of my noise reduction system.

In the radio receiving system illustrated in Fig. 1, an antenna 10 is provided for collecting radio frequency waves and supplying them to amplifier 11. The specific details of the antenna 10 and the amplifier 11 form no part of my invention and, therefore, need not be considered. Preferably, the amplifier 11 comprises several stages of amplification having a wide band pass characteristic.

The output of the amplifier 11 is coupled by means of transformer 12 to a detector 13, which may be of any suitable type. In Fig. 1 detector 13 has been shown as a diode having its anode 14 connected to one terminal of the tuned circuit comprising the secondary of the transformer 12 and capacitor 15 and its cathode connected to the opposite terminal of this tuned circuit through resistances 16 and 17 for unidirectional pulse currents and through capacitor 18 for radio frequency current. The voltage drop developed across resistor 16 may be applied through the filter comprising resistor 20 and condenser 21, connected to ground, by means of conductor 22 to the amplifier 11 for the usual automatic volume control purpose.

The output currents of detector 13 flowing through resistor 16 comprise both signal currents and noise currents. In a pulsing system the signal currents have a regular recurrence, for example 1000 pulses per second, whereas the noise currents cover the frequency band continuously from very low to very high frequencies. In accordance with my invention this property of regular recurrence of these signal currents is used to discriminate the signal from noise present in the circuit.

Assume that the wave received by the antenna 10 is of the wave form illustrated by the wave A of Fig. 1. Individual pulses contained in this wave are all substantially rectangular in shape. It is well known that any non-sinusoidal periodic wave may be resolved into a Fourier series of component waves, each of simple sinusoidal wave form. It is also a demonstrable fact that a periodic wave, composed of identical rectangular pulses recurring at regular intervals, is analyzable into a fundamental sine wave having a frequency equal to the rate at which the identical pulses recur, plus an almost infinite number of sine waves whose frequencies are different harmonics of the fundamental. Thus, the frequency of recurrence of the identical pulses determines the lowest frequency present in the sine waves of the series. The amplitude and duration of the individual pulses determine the magnitudes of the component waves and the particular harmonics present. Distortion of the rectangular wave form does not eliminate the fundamental, though the magnitudes of the various component waves and the particular harmonics present are altered. These sine waves of the Fourier series are not merely abstract mathematical quantities. They are physical realizable electrical waves which may easily be derived from the non-sinusoidal rectangular waves by suitable circuits. Accordingly the signal A can be reproduced without distortion whenever a series of narrow band pass filters is provided, one for each harmonic component.

For the purpose discussed above, the filters 24, 25, 26, and 27 are coupled to the output circuit of detector 13, filters 24 and 25 being designed to transmit a single, and filters 26 and 27 several, of the harmonic components of the input wave A. In order that one filter does not act as a short-circuit for the frequency which a different filter is designed to pass, it is desirable that these individual filters be coupled to the output of detector 13 by some means having a high impedance, such as the buffer tubes 30. For a similar purpose the buffer tubes 31 are provided across the output of the individual filter circuits.

The filter circuit 24, comprising inductance 32 and capacitor 33, is tuned to resonance at the fundamental frequency of the input wave A, that is the frequency of occurrence of the pulse of the wave A. As the repetition rate of this pulse usually is derived from a crystal oscillator or other generator having a very high frequency stability, by making the filter 24 a very high quality circuit, the pass band of this filter may be made very narrow. Under such conditions, currents of the fundamental frequency only are supplied to the control grid of the upper buffer tube 31 by the filter circuit 24, currents of all other frequencies being by-passed by this filter circuit.

In a manner similar to that discussed with reference to filter circuit 24, filter circuit 25 may be selected to pass the second harmonic component of the wave A. Similarly, any other number of filters may be provided to pass the higher harmonic components of the wave A, the number selected being determined by the fidelity of reproduction of the wave A desired in the output of the filter circuits.

Ultimately, the inductances and capacitors of the filter circuits may be replaced by a multiple resonant filter, such as the quarter wave coaxial transmission line 26 comprising the outer tube 34 and the inner conductor 35. This type of filter gives maximum transmission at the higher odd numbered harmonics of the wave A. In order to reproduce the higher numbered even harmonics, a similar transmission line 27 may be used, having a length which is ⅛, or some odd multiple thereof, of the wave length of the even harmonics to be transmitted by this particular filter. It is realized, of course, that where the repetition rate of the pulses is sufficiently high, the filters 24 and 25 may be eliminated, filters such as the line 34 in the units 26 and 27 being sufficient in such cases.

As is shown in Fig. 1, the buffer tubes 31, connected to the individual filter circuits, have a common output circuit which is coupled to the upper vertical deflection plate 36 of the cathode ray tube 37, the lower plate 36 being connected to ground. The cathode ray tube 37 may be of any well-known form and the details thereof form no part of my invention. Briefly, means are provided therein for developing and projecting an electron ray 38 against a fluorescent screen 39 at the end of the envelope. The intensity of the ray 38 is controlled by the potential applied to the control electrode 40. The ray is caused to scan the target in a horizontal plane in a well-known manner through the action of the ray-deflecting plates 41 to which suitable scanning potentials, such as the saw-tooth wave 42, are supplied from a suitable potential source, not shown. Vertical deflection of ray 38 is effected by the potential supplied to plates 36 by the filters 24—27.

The buffer tubes 30 have been shown as triodes having control electrodes connected to the common points of resistors 16 and 17 by coupling capacitors 43. Buffer tubes 31, likewise, have been shown as triodes whose control electrodes are connected to the output of the individual filters by means of coupling capacitors 44. Operating potential for the buffer tubes 30 and 31 may be supplied from any suitable source, such as the battery 45. It will be realized, of course, that while buffer tubes 30 and 31 have been shown as triodes, any suitable multiple-electrode type of electron discharge device may be used.

The operation of the noise reduction circuit thus far described may be shown quite clearly by reference to Fig. 3 in which curve B represents the instantaneous spectrum of the output of the detector 13 in the absence of a pulse signal A. Under such conditions, curve B represents the noise energy received in the amplifier 11 and transmitted to the filter circuit. This noise is uniformly distributed over the entire frequency band of the receiver. Curve C represents the noise energy transmitted by the filter system of my invention. As is at once apparent, the amount of noise which passes through the filter is greatly reduced over that present in the output of the detector 13. Thus the filter unit 25 passes the noise energy occurring at the pulse repetition rate $f_p$, while the unit 26 passes the noise energy occurring at the frequency $2f_p$. Ultimately, the units 26 and 27 are operative at the higher harmonics to pass the noise energy present at the higher multiples of $f_p$.

Curve D of Fig. 3 represents the spectrum of the output of the filter circuit when the amplifier 11 is receiving a pulse of the wave A. Each individual component of the pulse is transmitted by the filter circuit tuned to that particular frequency together with the noise components which lie within the band of the filter. The components of pulse signal and noise transmitted by all of the filters are added in the output circuits of the buffer tubes 31 and supplied to the plates 36 of the cathode ray tube 37. Since the amount of noise energy appearing in the output of the filter circuits is but a small portion of that present in the input thereof, the tendency of the noise to mask the desired signals is greatly reduced. Hence, weaker signals may be detected and reproduced on the cathode ray tube.

Referring to Fig. 2, there is shown the block diagram of a radio echo system embodying the noise suppression circuit illustrated in Fig. 1. The antenna 100 radiates the pulses of signals transmitted to it from transmitter 101. These pulses of radiated signal impinge upon a distant reflecting surface and produce echoes which are received by the antenna 100 and supplied to the receiver 102. It is essential for best operation of my radio echo system that the antenna be trained on the reflecting surface so that reflected signals are received continuously by the antenna and conducted to the receiver 102. Such a result may be obtained in the case of a moving reflecting object, for example, an aircraft or similar body, by the use of suitable follow-up means (not shown) in conjunction with the directional antenna array 100. With this arrangement a continuous succession of echo pulses are received by antenna 100 and supplied to receiver 102. In the receiver 102 these echo pulses are detected and a substantial portion of the noise energy is removed by means of the filter system 102' described in Fig. 1.

In one particular form of the invention, a single band pass filter is used in the filter system 102'. This may be the filter 24 which is tuned to the first harmonic of the transmitter pulse. The intensity of the single frequency output wave of filter 102' is limited to a predetermined intensity by the limiter 103 and the output wave of the limiter is supplied to the phase comparator 104.

Operation of the transmitter 101 is controlled by keying pulses of voltage supplied thereto from a multivibrator 105. So controlled, the transmitter 101 supplies to the antenna 100 a wave of signal similar to the wave A, shown in Fig. 1. It may be seen that this output wave is impressed, likewise, on receiver 102. Since this direct signal is many times stronger than the echo signals received by antenna 100 and amplified in receiver 102, even after the elimination of all frequencies but the first harmonic, and limiting in the limiter 103, the difference in intensity of the two signals is so great that the phase variation is hard to detect. In order to overcome this difficulty, the receiver 102 is desensitized during periods at which pulses radiated by the transmitter reach the receiver directly and a pulse of voltage having an intensity equal to the intensity of the output wave of the limiter 103 is supplied by the multivibrator 105 to the phase comparator 104.

The desensitizing means for the receiver 102 comprises the master oscillator 106 which generates a train of pulses which may, for example, be shaped to have the general form of the output wave A of transmitter 101, but of slightly greater duration, and which may have a frequency which is either equal to or some multiple of the frequency of the output pulse of transmitter 101. The output of master oscillator 106 is supplied to receiver 102 in a manner well known in the art to place on all the electron discharge tubes of receiver 102 a "gating" signal of such a sort that these tubes are cut off during the periods that this pulse is supplied. In this manner the master oscillator 106 acts as a desensitizing means to supply a blanking pulse to the receiver during the period at which pulses radiated by the transmitter reach the receiver directly.

In the operation of the distance measuring system described above, the multivibrator 105 supplies a keying pulse of voltage for controlling the operation of the transmitter. So controlled, the transmitter 101 supplies to the antenna 100 a wave of signal similar to the wave A shown in Fig. 1. At the same time, the multivibrator 105 supplies a reference voltage, or signal, of limited intensity to the phase comparator 104. This reference signal is first passed through a filter system 108 similar to the filter 102' so that single harmonic waves supplied to the phase comparator 104 by the receiver 102 and the multivibrator 105 are of the same frequency. During operation of the transmitter 101, the master oscillator 106 provides a blanking pulse to the receiver 102 which desensitizes the receiver 102, protecting its circuits from the high intensity signals developed in the transmitter 101. At the end of the keying pulse which controls the operation of transmitter 101, the transmitter is silenced. Antenna 100 is now free to receive reflected or echo pulses and supply them to receiver 102. In the receiver, all of the component frequencies, with the exception of the first harmonic, are filtered out. The first harmonic, after limiting to a predetermined intensity in the limiter 103, is supplied to the phase comparator 104. The phase comparator 104 may be of any desirable type, and preferably indicates directly on the scale 107 the difference in phase between the selected harmonics of the reference voltage and the echo signal.

As previously stated, the frequency of recurrence of the pulses of the master oscillator 106 may be either equal to, or some multiple of, the recurrence of pulses of the transmitter 101. The desirable relationship between these frequencies and the manner in which it may be determined become apparent from the following explanation. When a blanking pulse having the same frequency as the keying pulse operates to eliminate the transmitted pulses, the incoming noise is interrupted at the rate of the blanking pulse. This may possibly produce some component of the pulse repetition rate which is passed by the tuned circuit 24 of the receiver. This component unites with the component of the echo pulse and the resultant wave conducted to the phase comparator 104 by the receiver 102 is a false indication of the distance of the reflecting object.

Depending on particular operating conditions, the component of the pulse repetition rate which appears in the output circuit of receiver 102, because of the amount of noise present therein, may not be objectionable; under such conditions, blanking the receiver at the frequency of the keying pulse is permissible. If, however, the component of the keying pulse frequency introduced by noise should be objectionable, the operation of the receiver may be interrupted at a rate which is twice the rate of recurrence of the keying pulse, or some higher multiple. Such a blanking pulse is effective to completely block the transmitter pulse from the receiver and, at the same time, does not result in the production of any components at the fundamental keying pulse frequency.

It will be realized that the above discussion concerning the relation of the frequency of vibration of the oscillator 106 and the multivibrator 105 is pertinent only to instances in which my noise reduction system is applied to a receiver employing a single band pass filter and used for measuring the phase difference between transmitted and reflected pulses. As in the previous case, it is desirable that the antenna array 100 be trained on the reflecting object so that a sufficient number of reflected pulses are received to build up the single selected harmonic in the receiver 102.

Preferably, the output from the master oscillator 106 may also be supplied to the multivibrator 105. In a manner well known to the art, multivibrator 105 may be designed to generate a wave of a form similar to that generated by the oscillator 106 and consisting of a series of pulses which recur, depending upon the relationship desired, at intervals corresponding either to the same frequency or to a sub-multiple of the frequency of recurrence of the blanking pulses supplied by the master oscillator 106 to the receiver. In this manner, the blanking pulses for the receiver 102 are synchronized rigidly with the keying pulses for the transmitter 101.

It is thus seen that my invention provides a receiver for a pulse signalling system in which the noise is reduced to a very low level. One particular application where this invention is very useful is in a radio echo system used for distance measuring. It may be applied with equally good results to direct point-to-point communication systems. By use of a blanking pulse, not only are the transmitter signals eliminated as a source of error in the distance-measuring circuit, but also the receiver circuits are protected from the high intensity signals of the transmitter. It is obvious that modifications of the system may be made. Thus, for example, instead of the phase comparator 104, the cathode ray oscilloscope 37 of Fig. 1 may be used in the system of Fig. 2.

While I have shown particular embodiments of my invention, therefore, it will be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In a signalling system in which pulses of high frequency oscillation are radiated at regular intervals and a continuous succession of evenly spaced pulses are received, the combination of means for transmitting said pulses, keying means connected to said transmitting means, means for receiving and detecting said pulses, and means for desensitizing said receiving means for short evenly spaced periods and at a frequency which is a multiple of the frequency of said pulses, said desensitizing means comprising a multivibrator synchronized with said keying means and connected to said receiving means, said periods including intervals during which pulses radiated by said transmitter reach said receiver directly.

2. In combination, means for transmitting a pulse of high frequency oscillation at regular intervals, means for receiving a continuous succession of said pulses after reflection from a reflecting object, and means for indicating the distance between said receiving means and said reflecting object, said indicating means comprising means for supplying a reference signal having the same time occurrence as said transmitted pulse, means in said receiving means for selecting a single harmonic component of said reflected pulse, and means for measuring the phase angle between said reference signal and said component.

3. In combination, means for transmitting a pulse of high frequency oscillation at regular intervals, means for receiving a continuous succession of said pulses after reflection from a reflecting object, means for desensitizing said receiving means during transmission of said pulse, and means for indicating the distance between said receiving means and said reflecting object, said indicating means comprising means for supplying a reference signal having the same time occurrence as said transmitted pulse, means in said receiving means for selecting a single harmonic component of said reflected pulse, and means for measuring the phase angle between said reference signal and said component.

4. In combination, means for transmitting a pulse of high frequency oscillation at regular intervals, means for receiving and detecting said pulse after reflection from a reflecting object, means including a blanking pulse for desensitizing said receiving means during periods of operation of said transmitting means, and means for reducing the noise present in the output of said receiving means, said noise reducing means comprising a plurality of resonant circuits tuned respectively to the frequency of said pulse and at least one harmonic thereof, and means for decoupling each of said circuits from the remainder of said circuits.

5. In a receiver for a pulse signalling system in which a regularly recurring pulse of high frequency oscillation is supplied to said receiver, an input circuit and an output circuit, and means for reducing the noise translated between said circuits, said means comprising a plurality of narrow band pass filters tuned respectively to the frequency of recurrence of said pulse and harmonics thereof, and means for decoupling each of said filters from the remainder of said filters.

6. In a receiver for a pulse signalling system in which a regularly recurring pulse of high frequency oscillation is supplied to said receiver, an input circuit and an output circuit, means for reducing the noise translated between said circuits, said means comprising a plurality of narrow band pass filters tuned respectively to the frequency of recurrence of said pulse and harmonics thereof, said filters being connected in parallel, and coupling means of high impedance connected between each of said filters and said input and output circuits.

7. In a pulse signalling system in which a regularly recurring pulse of high frequency oscillation is transmitted and a continuous succession of echo pulses is received after reflection from a distant object, means for receiving said echo pulses, means for selecting a single harmonic component from said echo pulses, means for limiting the intensity of said component to a predetermined intensity, means for supplying a reference signal having an intensity comparable to that of said component and having the same time occurrence as said transmitted pulse, and means for measuring the phase angle between said reference signal and said component.

8. In a signalling system, the combination of means for radiating a pulse of high frequency oscillation at regular intervals, means for receiving a continuous succession of said pulses after reflection from a reflecting object, means for desensitizing said receiving means for short evenly spaced intervals having a time occurrence which includes said radiation interval and a frequency which is a multiple of the frequency of said pulse, means for selecting a single harmonic component of said reflected pulse, means for supplying a reference signal having the same time occurrence as said radiation interval, and means for measuring the phase angle between said reference signal and said component.

EVERHARD H. B. BARTELINK.

REFERENCES CITED

The following references are of record in the file of this patent:

UNITED STATES PATENTS

| Number | Name | Date |
| --- | --- | --- |
| 1,446,890 | Espenschied | Feb. 27, 1923 |
| 2,055,883 | Terry | Sept. 29, 1936 |
| 2,083,344 | Newhouse et al. | June 8, 1937 |
| 2,255,839 | Wilson | Sept. 16, 1941 |